US006695703B1

(12) United States Patent
McGahn

(10) Patent No.: US 6,695,703 B1

(45) Date of Patent: Feb. 24, 2004

(54) ILLUMINATION DISPLAY HAVING REPLACEABLE INSERTS

(75) Inventor: Steven P. McGahn, Reno, NV (US)

(73) Assignee: IGT, Reno, NV (US)

( * ) Notice: Subject to any disclaimer, the term of this patent is extended or adjusted under 35 U.S.C. 154(b) by 0 days.

(21) Appl. No.: 09/627,199

(22) Filed: Jul. 27, 2000

(51) Int. Cl.[7] .......................... A63F 13/00; G09F 13/04

(52) U.S. Cl. ............................ 463/46; 40/575; 40/611; 40/649

(58) Field of Search .......................... 40/649, 651, 575, 40/576, 611, 618, 124, 124.4, 777; 273/143 R, 138.1, 138.2; 46/46, 20, 16

(56) References Cited

U.S. PATENT DOCUMENTS

| | | | | | |
|---|---|---|---|---|---|
| 950,912 | A | * | 3/1910 | Harrington | 40/493 |
| 2,128,988 | A | * | 9/1938 | Christian | 273/138.1 |
| 2,510,331 | A | * | 6/1950 | Crosby | 40/618 |
| 3,279,112 | A | * | 10/1966 | Gould et al. | 40/710 |
| 3,886,348 | A | * | 5/1975 | Jonathan et al. | 362/127 |
| 4,021,949 | A | * | 5/1977 | Niehaus et al. | 40/361 |
| 4,146,985 | A | * | 4/1979 | Margulies | 40/710 |
| 4,377,049 | A | * | 3/1983 | Simon et al. | 40/465 |
| 4,440,457 | A | * | 4/1984 | Fogelman et al. | 463/46 |
| 4,513,968 | A | * | 4/1985 | Okada | 273/143 R |
| D284,592 | S | | 7/1986 | Drews et al. | |
| 4,805,331 | A | * | 2/1989 | Boggess et al. | 40/651 |
| 4,957,256 | A | * | 9/1990 | Boeding | 248/225.11 |
| 5,419,062 | A | * | 5/1995 | Polinski et al. | 40/124.4 |
| 5,579,599 | A | * | 12/1996 | Haeseler | 40/606 |
| D400,597 | S | | 11/1998 | Hedrick et al. | |
| D403,363 | S | | 12/1998 | McGahn et al. | |
| D404,084 | S | | 1/1999 | Hedrick et al. | |
| D404,436 | S | | 1/1999 | McGahn et al. | |
| D406,615 | S | | 3/1999 | Griswold et al. | |
| D416,054 | S | | 11/1999 | McGahn et al. | |
| 5,987,825 | A | * | 11/1999 | Rosen | 52/36.1 |
| 5,988,405 | A | * | 11/1999 | Weisenburger | 211/40 |
| D421,277 | S | | 2/2000 | McGahn et al. | |
| 6,231,446 | B1 | * | 5/2001 | Majina et al. | 463/46 |

OTHER PUBLICATIONS

Slot Machines published by Reno–Tahoe Specialty, Inc. in 1989.
Top Dollar Brochure published by IGT in 1998.
Wheel of Fortune Brochure published by IGT in 1999.
Slotopoly Brochure published by IGT in 1998.
Wheel of Fortune Brochure published by IGT in 1998.
Totem Pole Brochure published by IGT in 1997.
Elvis Brochure published by IGT in 1999.
Keno Machine Picture.

* cited by examiner

*Primary Examiner*—Andrea Chop
(74) *Attorney, Agent, or Firm*—Bell, Boyd & Lloyd LLC

(57) ABSTRACT

An illuminated display apparatus for use with a gaming device, where the display device includes a generally planar template with a plurality of sections having different sizes and shapes. The template is adapted to be illuminated by the gaming device. The sections define a plurality of apertures of differing shapes and sizes adapted to receive a plurality of removable and replaceable inserts. The plurality of inserts have corresponding differing shapes and sizes, wherein the inserts are adapted to removably engage the insert holders that have a similar shape and size.

44 Claims, 8 Drawing Sheets

ILLUMINATION DISPLAY HAVING REPLACEABLE INSERTS

The present invention relates in general to an illumination display with inserts, and more particularly to an illumination display with replaceable inserts used with a gaming device.

BACKGROUND OF THE INVENTION

One purpose of any gaming device, vending or dispensing machine is to make the device or machine profitable. Generally, this requires that the machine attract patrons to play the game or purchase the machines' products. One method of attracting patrons is to use a display that catches the patron's attention, advertising the products sold by the machine or otherwise displaying pictures, graphics, symbols or other indicia that attract patrons to play the game. For example, a slot machine might display symbol combinations and possible winnings, while a video poker game might display various winning hands. Alternatively, a pinball game might display popular pictures associated with a particular game representing television shows, movies, comic book characters, etc.

Known gaming devices do not use standard displays. Each type of machine requires a different type display. For example, a slot machine gaming device might have one type of display, while a keno gaming device might have a different type of display. These displays generally differ from each other and would generally differ from the displays used with pinball machines or product dispensing devices. This requires a separate manufacturing and assembling process to produce each of the different displays to accommodate the requirements of the various gaming devices. This process is both time intensive and expensive. Furthermore, updating a gaming device or other machine to represent a new game or fad, or to display a new product requires that a new display be manufactured, assembled and placed in the machine or device.

Accordingly, there is a need for a display that can be used with more than one gaming device or machine. In addition, there is a need for a display that uses removable inserts so that the display can be easily updated or modified depending on the gaming device or machine requirements.

SUMMARY OF THE INVENTION

The present invention overcomes the above shortcomings by providing an illumination display that can be used with a plurality of gaming machines and devices. This requires only one manufacturing and assembly process, saving both time and money. The display uses different types of removable and replaceable inserts used with the illumination display to accommodate the requirements of the different types of gaming machines and other devices. Updating or modifying a gaming machine or device simply requires replacing the old inserts with the new inserts.

The present invention serves a number of purposes. Specifically, it provides a display that can be used with a plurality of different devices or machines. Moreover, the display includes a template that provides a background that is offset from, but used in conjunction with, the inserts providing a three dimensional effect that attracts the patrons' attention. Furthermore, the display is formed so that the frame is offset or in spaced relationship to the cover of the gaming device or the machine so that the inserts are flush with the glass cover thus enhancing their visibility. Furthermore, this spaced relationship enables the display to accommodate inserts of varying thickness, creating different effects.

It is therefore an object of the present invention to provide an illumination display having replaceable inserts.

Another object of the present invention is to provide an illumination display that can be used with different types of gaming or other similar display.

Other objects, features and advantages of the invention will be apparent from the following detailed disclosure, taken in conjunction with the accompanying sheets of drawings, wherein like numerals refer to like parts, elements, components, steps and processes.

BRIEF DESCRIPTION OF THE DRAWINGS

FIG. 1 is a front plan view of the illumination display of FIG. 1;

DETAILED DESCRIPTION OF THE INVENTION

Figure 1:
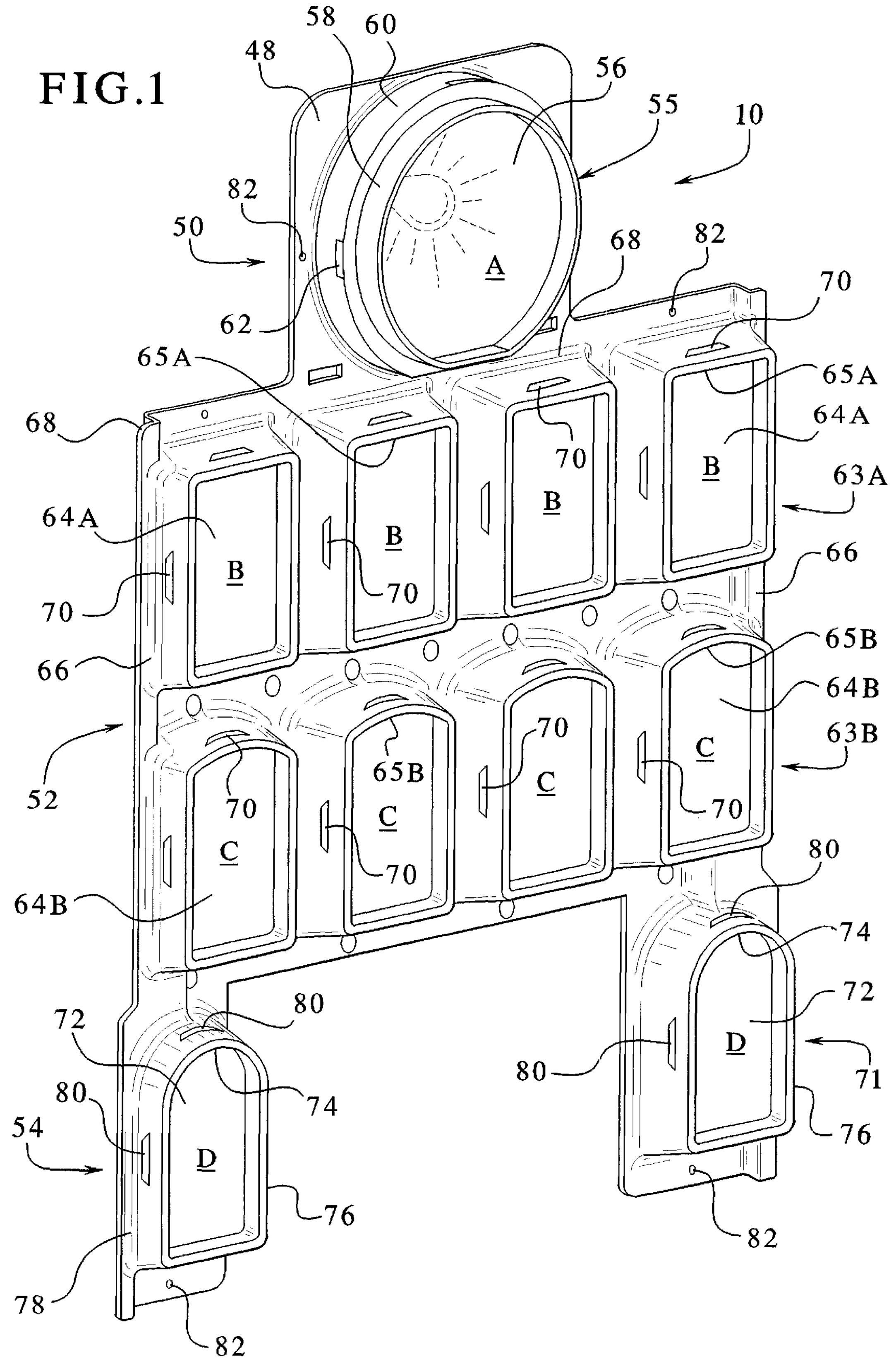
FIG. 1 is a perspective view of one embodiment of the illumination display of the present invention.
Figure 2:
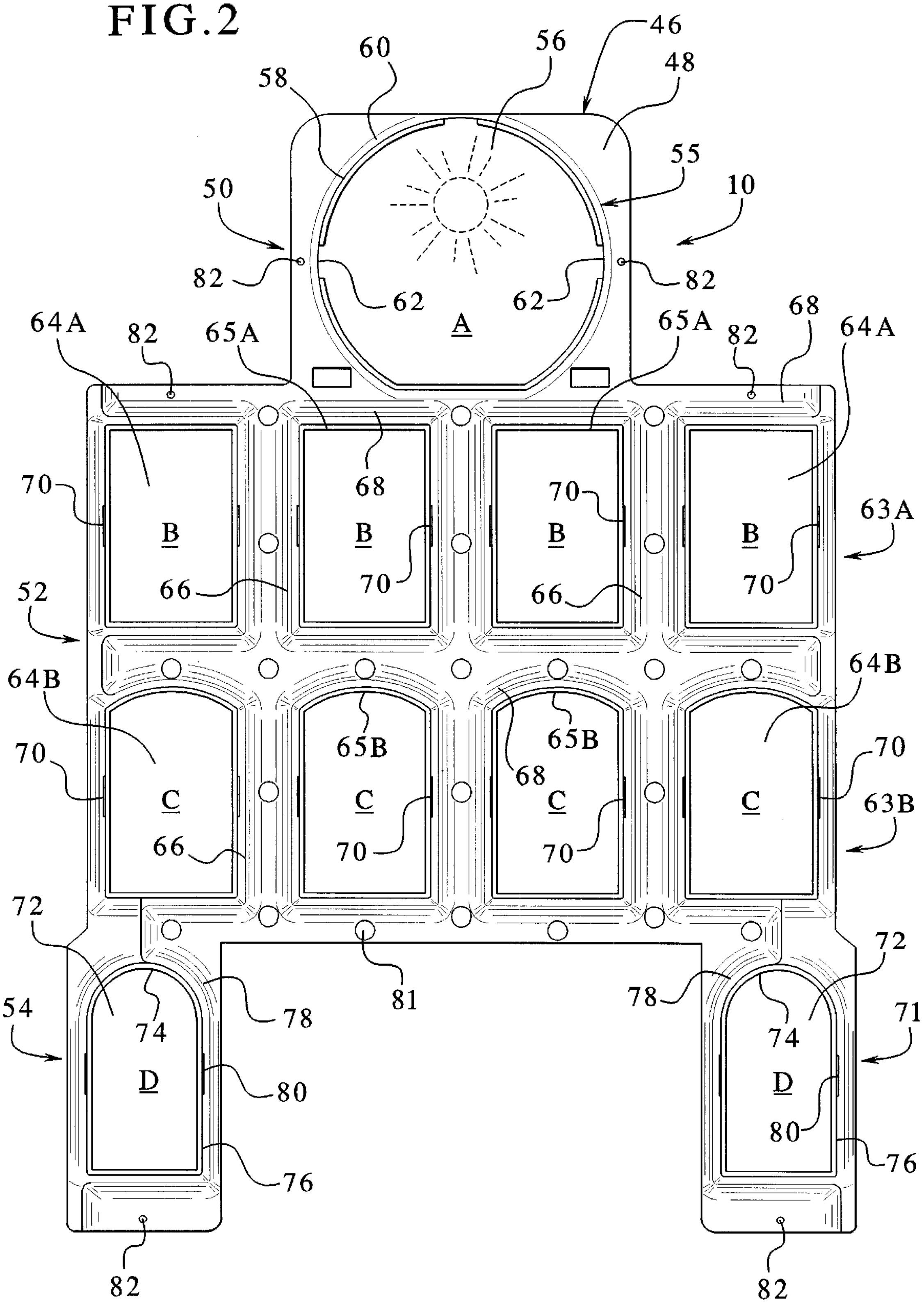
Figure 3:
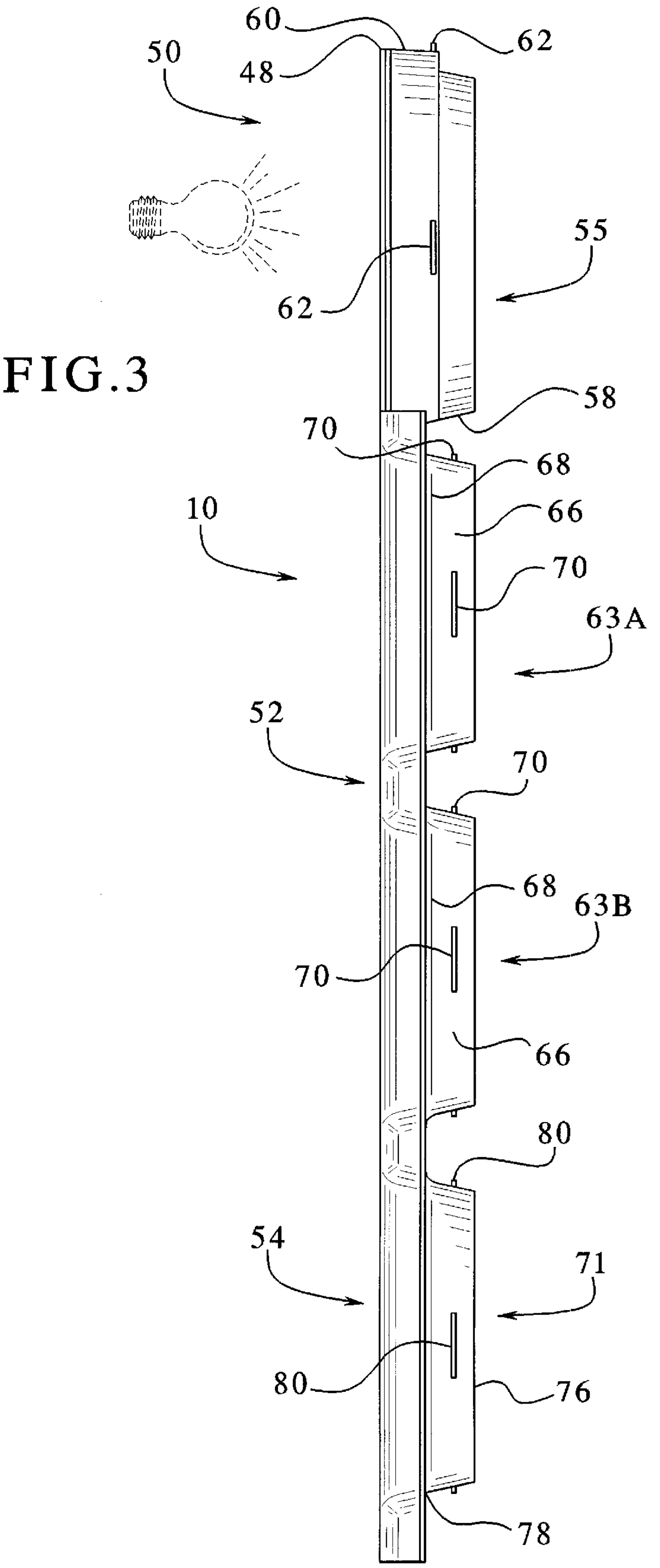
FIG. 3 is a side elevational view of the illumination display of FIG. 1.
Figure 4:
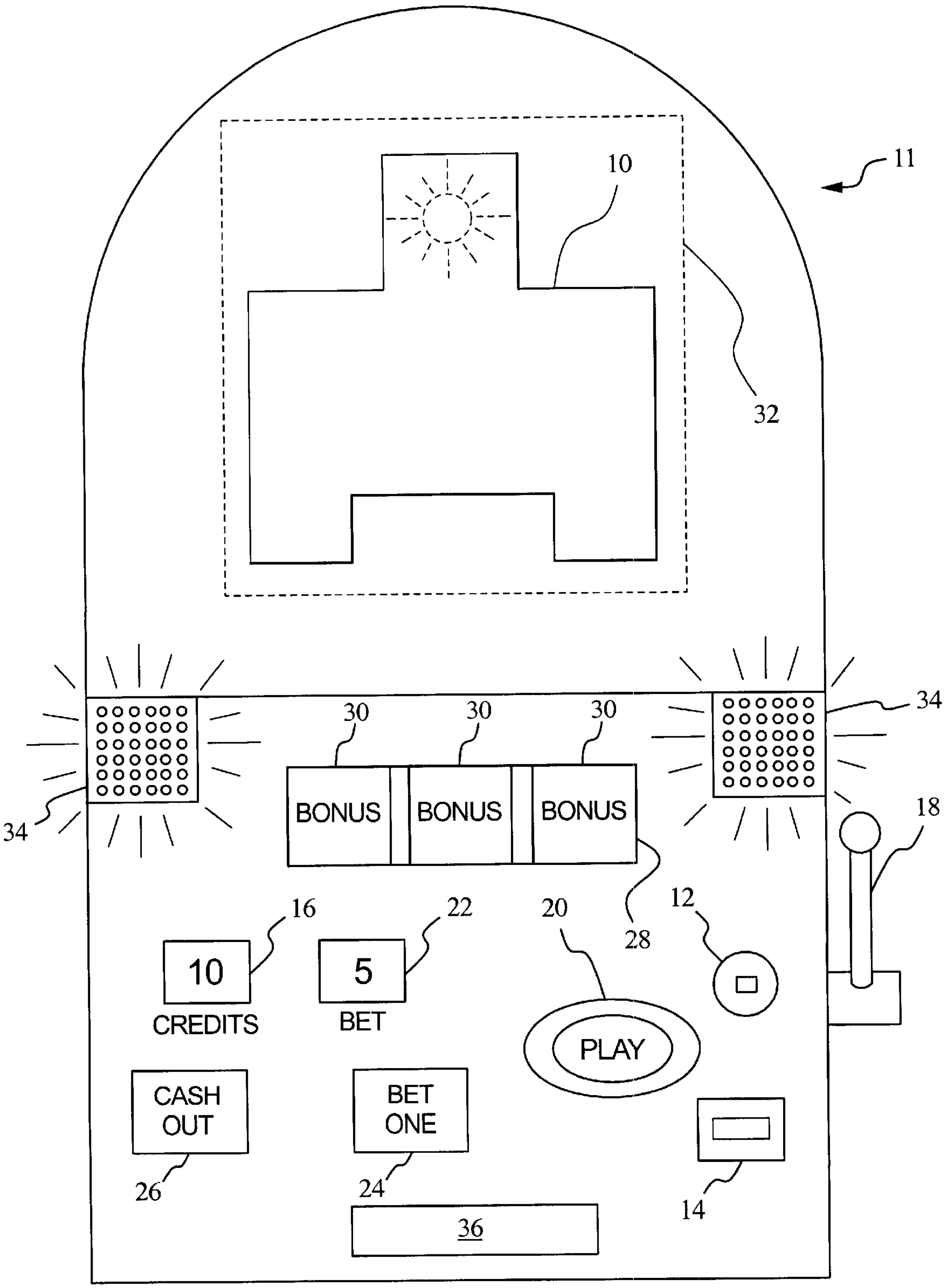
FIG. 4 is a front plan view of a gaming device used with the illumination display of the present invention.
Figure 5A:
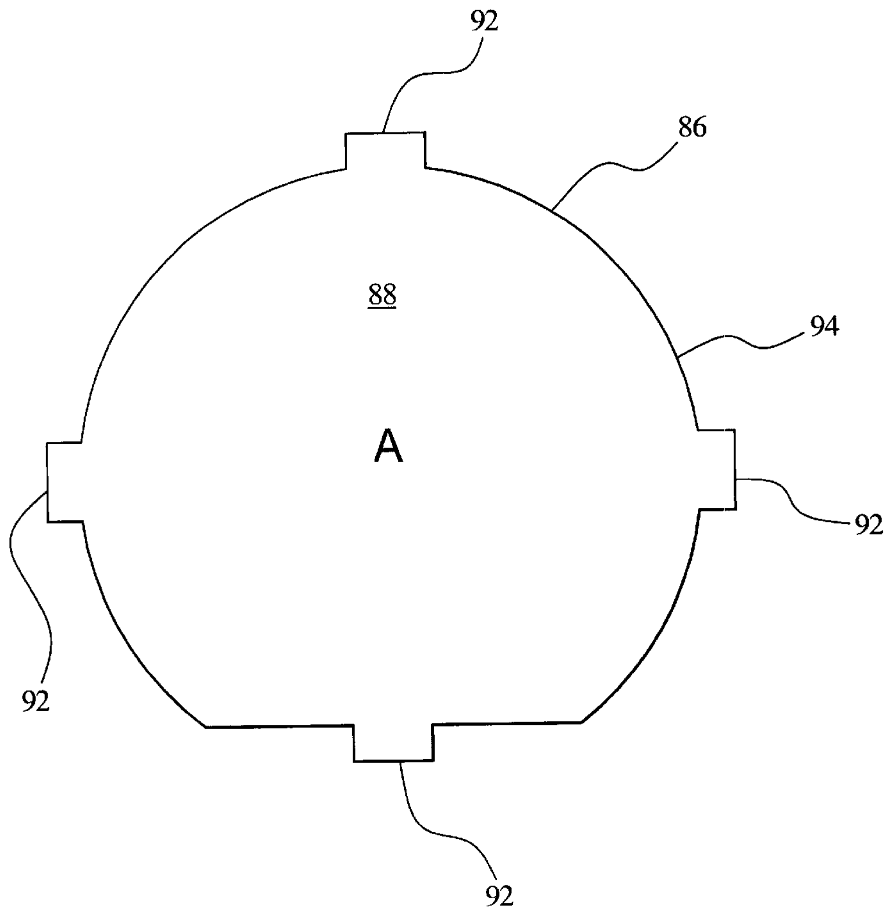
FIG. 5A is a front elevational view of a first replaceable insert of the present invention.
Figure 5B:
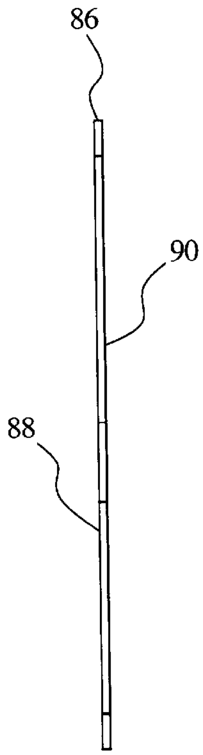
FIG. 5B is a side elevational view of the first replaceable insert of FIG. 5A.
Figure 6A:
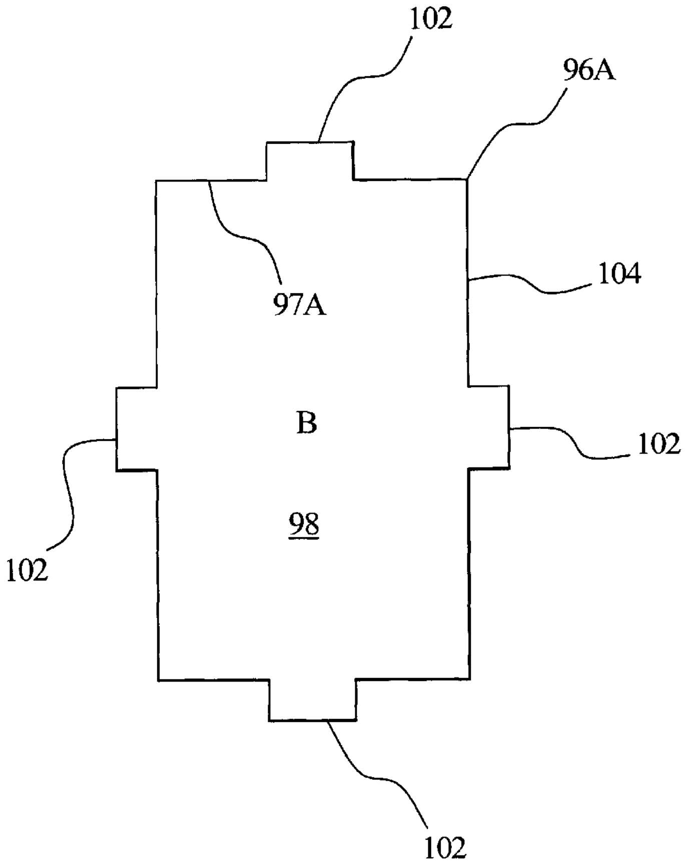
FIG. 6A is a front elevational view of a second replaceable insert of the present invention.
Figure 6B:
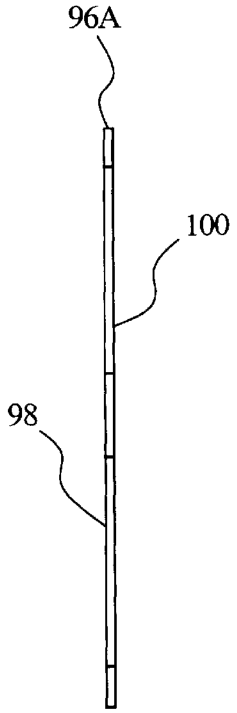
FIG. 6B is a side elevational view of the second replaceable insert of FIG. 6A.
Figure 6C:
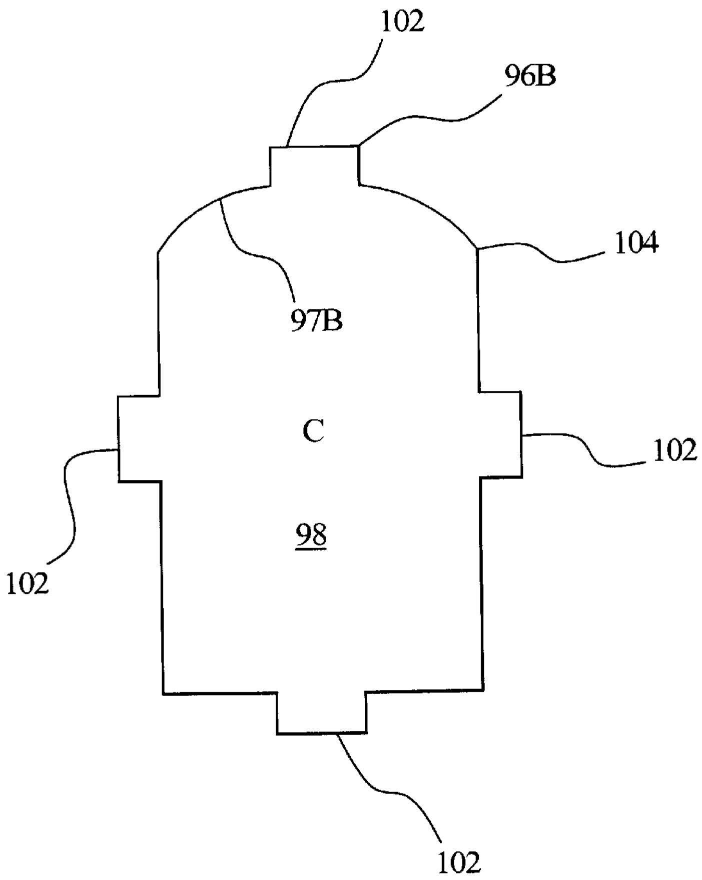
FIG. 6C is a front elevational view of an alternative embodiment of the second replaceable insert of the present invention.
Figure 6D:
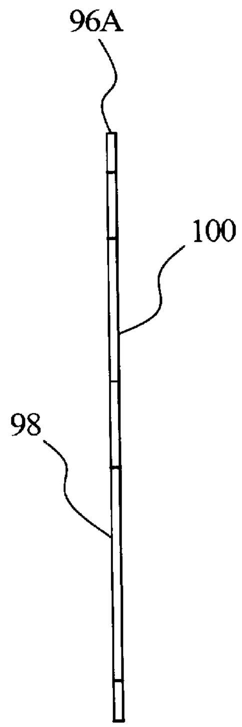
FIG. 6D is a side elevational view of the alternative embodiment of the second replaceable insert of FIG. 6C.

Referring now to the drawings, and particularly to FIGS. 1 through 3, one embodiment of the illumination display of the present invention, generally designated numeral 10, is adapted to be used in a gaming device 11 as generally illustrated in FIG. 4. Device 11 is preferably a machine having the controls, displays and features of a conventional slot machine or other gaming device. Device 11 is constructed so that a player can operate the device while standing or sitting. The device 11 can also be constructed as a pub-style tabletop game (not shown) which a player can operate preferably while sitting. Device 11 can incorporate any game, such as slot, poker or keno.

It should be appreciated that the present invention can be used with any type of device or machine, including a juke box, pinball game, video game, vending or dispensing machine (stamp dispenser or collector card dispenses for example), or other similar devices. Such devices, dispensers and machines are collectively referred to as "device" or "devices."

Preferably, the device 11 includes a conventional illumination source mounted behind the illumination display 10 which is adapted to illuminate the display. As illustrated in FIG. 4, device 11 includes a coin slot 12 and bill acceptor 14 where the player inserts money, coins or tokens. Other devices could be used for accepting payment such as readers or validators for credit cards or debit cards 16. After depositing the appropriate amount of money, a player can begin the game by pulling arm 18 or pushing play button 20. Play button 20 can be any play activator used by the player that starts any game or sequence of events in the device 11. It should be appreciated that appropriate button and levels are contemplated for different devices.

The device 11 illustrated in FIG. 4 includes a bet display 22 and a bet one button 24. The patron places a bet by pushing the bet one button 24. The patron can increase the bet by one credit at a time each time the player pushes the bet one button 24. Device 11 also has a display window 28 that contains a plurality of reels 30, preferably three to five reels in mechanical or video form. Each reel 30 displays a plurality of indicia such as bells, hearts, fruits, numbers, letters, bars or other images which preferably correspond to a theme associated with the device 11.

Device 11 preferably includes a display device 32. The display device 32 is capable of portraying or displaying images, symbols and other indicia including images of people, characters, places, things and card faces associated with the game or the products dispensed. This display device 32 generally attracts patrons to play the game or purchase the products. The display device 32 also includes the illumination display 10 of the present invention.

More specifically, display 10 includes a molded body 46 as illustrated in FIGS. 1 to 3 and a plurality of inserts as illustrated in FIGS. 5A to 7B. The body is preferably made of a translucent molded plastic (but can be extruded, cut or manufactured in any conventional manner using plastic or any other suitable material such as paperboard, glass, etc.). The body 46 is preferably formed as a single piece of clear or translucent material although colored or dyed material is also contemplated. While a single molded piece is preferred, it should be appreciated that body 46 could be formed from two or more pieces that are combined or otherwise joined to form the body.

In one preferred embodiment, the display 10 is associated with an illumination source (not shown) preferably provided by the device 11. However, it is also contemplated that a suitable illumination source could be attached to the display in accordance with the present invention. This illumination source could be a single illumination device such as a single bulb, light emitting diode "LED", light beam, fluorescent tube or fiber optic cable; or a plurality of illumination devices such as a plurality of bulbs, LED's, beams, tubes or cables. It is also contemplated that the plurality of illumination devices could all be of one color or various colors.

The body 46 includes a generally plan or frame or template 48 which includes a first portion 50, a second portion 52 and a third portion 54. The second portion 52 is integral with both the first and third portions 50 and 54, respectively. First portion 50 includes a first insert holder 55 which defines a generally circular aperture 56. While only one insert holder is depicted in the first portion 50, it should be appreciated that two or more insert holders are contemplated and other size and shape insert holders are contemplated.

The first insert holder 55 includes a cylindrical base 60 connected to and transversely extending from the template 48 and a cylindrical lip 58 connected to and extending from the base 60. The base 60 and lip 58 define aperture 56. At least one, and preferably two or more slots 62 are formed in insert holder 55, either in lip 58 or base 60. In one preferred embodiment, four slots 62 are formed in and equally spaced about the base 60 of the first insert holder 55; however, other arrangements such as three equally spaced slots 62 are contemplated. As discussed below, inserts having different indicia thereon are adapted to be removably mounted in the insert holder 55, and in particular, the inserts have tabs which engage the slots 62 to removably engage and properly align and secure the insert in aperture 56 in a removable and replaceable manner. While an engaging device comprising insert holder 55 and slots 62 is preferred, other engaging devices enabling the insert to removably engage the body 46 are contemplated, including velcro, tape, fasteners, at least two extending sills which hold the edges of the inserts, and a friction fit among other suitable attachment devices.

The second portion 52 of the frame 48 includes two types of insert holders 63A and 63B, respectively, which are collectively referred to herein as second insert holder(s) 63. The second insert holders 63 define at least one and preferably a plurality of generally rectangular second apertures 64. While a plurality of second insert holders differing in shape and size from the first insert holder 56 are preferred, it should be appreciated that the second portion could include one large insert holder defining one large aperture or a plurality of different shaped and sized insert holders defining a plurality of different size and shape apertures. For example, in the depicted embodiment, insert holders 63 are in two rows, where apertures 64B of the second row have a generally rounded edge 65B when compared to edge 65A of apertures 64A in the first row. It should be appreciated that one or both horizontal rows or vertical columns of insert holders could comprise an alternating array or pattern of insert holders. Furthermore, the rows could consist of one style of insert holder which define apertures alternating in shape and of differing sizes.

The second insert holder 63 includes a base 68 integral with and extending transversely from template 48 (either coplanar with template 48 or at a predetermined angle thereto) and a tubular lip 66 integral with and extending transversely from base 68 so that lip 66 converges or is angled inwardly towards the second aperture 64. In one preferred embodiment, base 68 and lips 66 completely define or circumscribe aperture 64, although it is contemplated that a plurality of bases 68 and lips 66 could be space about or not extended completely around aperture 64. At least one, and preferably two or more slots 70 are formed in second insert holder 63, either in base 68 or lip 66, so that the insert holder 63 and slots 70 form an engaging device with the inserts, although other engagement devices are contemplated as discussed previously. The insert holders 63 and slots 70 enable the inserts to be removably engaged and properly aligned in aperture 64. The slots 70 could also be arranged in different planes to angle or tilt the inserts as desired.

In one embodiment of the present invention, the third portion 54 includes spaced-apart third insert holders 71 which define third apertures 72. The third portion 54 depends from and is integral with the second portion 52. While two insert holders 71 are illustrated, it should be appreciated that a plurality of insert holders forming one or more rows are contemplated. The insert holders 71 are generally rectangular in shape with an arc-shaped upper edges 74. While this shape is preferred in this embodiment, any shape or size (or combination of shapes and size) is contemplated.

The third insert holder 71 includes a base 78 transversely extending from template 48 (either coplanar with template 48 or at a predetermined angle thereto) and lip 76 extending from base 78 (best viewed in FIGS. 2 and 3) as described previously for the first and second insert holders 55 and 63. Again, it is preferred that base 78 and lip 76 completely circumscribe aperture 78, however, other arrangements are contemplated as discussed previously. At least one, and preferably two or more slots 80 are formed in insert holder 71, either in lip 76 or base 78, whereby insert holder 71 and slots 80 form an engaging device for the insert. Again, preferably, four slots 80 are formed in and equally spaced about insert holder 71; however other arrangements, such as three equally spaced slots 80 are contemplated. The insert holder 71 and slots 80 enable the insert to removably engage the template 48 so that it is properly aligned and secured in aperture 72 in a removable and replaceable manner as discussed previously.

In the preferred embodiment of the display 10 of the present invention, the template 48 includes or defines a plurality of light apertures or holes 81 suitably sized for bulbs (not shown) to extend through. The template also includes fixture apertures 82 that enable the display 10 to be removably secured to the device 11 using screws, although other securing devices are contemplated.

The preferred embodiments of the inserts of the present invention are illustrated in FIGS. 5A through 7B. The first general round insert 86 is adapted to be inserted in the aperture 56 of the first insert holder 55. It is contemplated that insert 86 is comprised of a single piece of clear or translucent material (although colored material is also contemplated) adapted to be illuminated by the device 11. The insert 86 is preferably made of molded plastic although it can be extruded, cut or manufactured using other known materials such as glass, and using other potential methods of manufacture. Insert 86 includes an indicia display area 88 and a back area 90. Indicia display area 88 displays the images of people, characters, symbols, places, things, faces of cards, etc. to accommodate the device 11 (or used to display the products sold or distributed) and used to attract the patrons. It is also contemplated that the inserts could be blank depending on the requirements of the device. The indicia is preferably printed directly on indicia display area 88, although other marking methods are contemplated such as stickers, labeling, etching, etc.

As illustrated, first insert 86 includes at least one and preferably a plurality of flanges or tabs 92 integral with and projecting from edge 94 that are adapted to fit in or engage the slots in the first insert holder. The tabs 92 preferably have the same number and placement as slots 62 (although other arrangements are contemplated) so that the tabs 92 removably interact with slots 62 so that the inserts 86 removably engage and become properly aligned in aperture 56.

It should be appreciated that inserts are preferably comprised of a flexible material providing for easy insertion and removal from the template 48. During insertion, one tab 92 engages a corresponding slot 62. The insert 86 is then bent and pushed inwards towards the aperture 56 until the remaining tabs 92 engage the slots 96. The insert returns to its normal planar shape aligning the insert 86 in the aperture 56.

FIGS. 6A through 6D illustrate two embodiments of a generally planar second insert 96. Insert 96 is generally rectangular in shape and used with the second insert holder 63.

Insert 96B only differs from insert 96A in that it has a rounded upper edge 97B when compared to upper edge 97B. Insert 96 is preferably comprised of the same material and formed in a manner similar to first insert 86 as described previously. It is contemplated that inserts 96 could be comprised one color and material or differing colors and materials. For example, insert 96A could be comprised of one color and material while insert 96B could be comprise of a different color and material. Insert 96 includes an indicia display area 98 and a back area 100. Indicia display area 98 includes the indicia used with the device 11. Insert 96 includes at least one, and preferably a plurality of flanges or tabs 102 integral with and projecting from edge 104, where tabs 102 preferably have the same number and placement as slots 70, so that the inserts 96 removably interact with slots 70. This interaction enables the inserts 96 to removably engage and become properly aligned in apertures 64A (or 64B as appropriate).

Figure 7A:
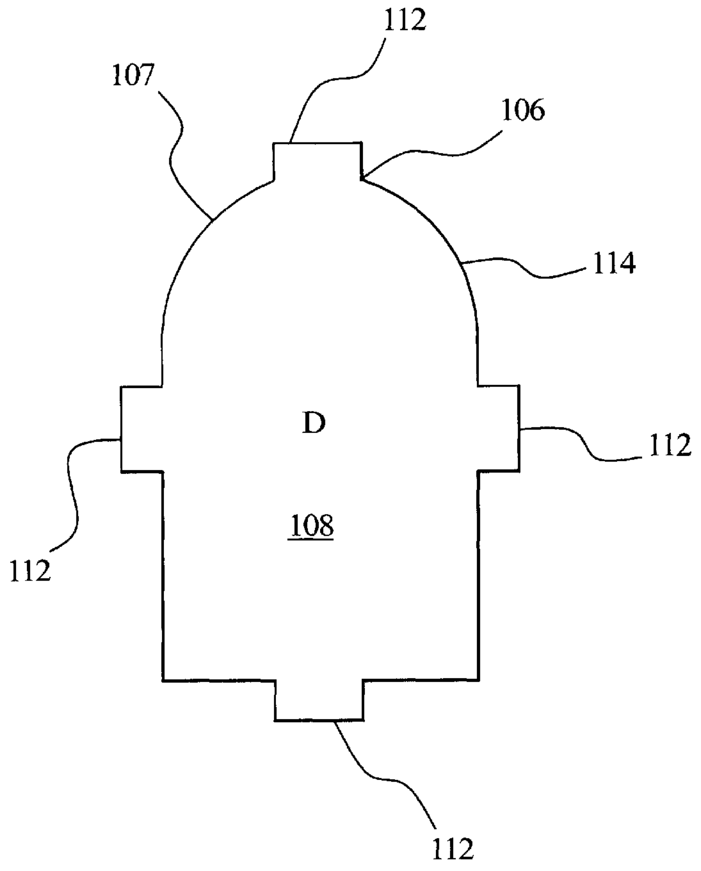
FIG. 7A is a front elevational view of a third replaceable insert of the present invention.
Figure 7B:
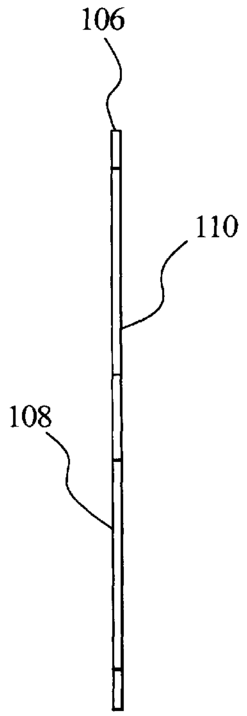
FIG. 7B is a side elevational view of the third replaceable insert of FIG. 7A.

The third insert 106 is illustrated in FIGS. 7A and 7B. The third generally planar insert 106 is generally rectangular in shape having an arc-shaped upper edge 107. The insert 106 is used with the third insert holder 72. Insert 106 is preferably comprised of the same material and formed in a manner similar to the first and second inserts 86 and 96, respectively, as described previously. Insert 106 also includes an indicia display area 108 and a back area 110. The indicia display area 108 includes the indicia used with the device 11. The indicia on each insert and on all of the inserts can vary in accordance with the theme of the gaming device.

As illustrated, insert 106 also includes at least one, and preferably a plurality of flanges or tabs 112 integral with and projecting from edge 114, where tabs 112 preferably have the same number and placement as slots 80. The tabs 112 act as an engaging device, removably interacting with slots 80 so that the insert 106 removably engages and becomes properly aligned in aperture 72.

The present invention serves a number of purposes. Specifically, it provides a display 10 that can be used with a plurality of different devices 11. The display 10 also provides template 48 which can be used to provide a background that is offset from, but used in conjunction with, the inserts 86, 96 and 106 respectively providing a three dimensional effect that attracts the patrons' attention. Furthermore, the display 10 is formed so that the template 48 is offset or in spaced relationship to the cover or front of the device 11 so that the inserts 86, 96 and 106 may be mounted adjacent to or flush with the glass cover, thus enhancing their visibility. Furthermore, this spaced relationship enables the display 10 to accommodate inserts of varying thickness, creating differing visual effects.

It should be appreciated that in one preferred embodiment, the present invention comprises an illuminated display 10 that can be used with a plurality of different devices 11. It is also contemplated that the present invention includes a removable template 48 that can be used with different devices 11. For example, it is contemplated that an existing device 11 can be updated or modified to accommodate a different game simply by replacing display 10 currently used with a device 11 with a new display 11 (new template 48 having new inserts). Additionally, it is contemplated that the template 48 could remain affixed in the device 11 while new inserts replace the inserts currently used with a template 48, updating the display 10 and thus the device.

While the present invention is described in connection with what is presently considered to be the most practical and preferred embodiments, it should be appreciated that the invention is not limited to the disclosed embodiments, and is intended to cover various modifications and equivalent arrangements included within the spirit and scope of the claims. Modifications and variations in the present invention may be made without departing from the novel aspects of the invention as defined in the claims, and this application is limited only by the scope of the claims.

The invention is hereby claimed as follows:

1. A gaming device having at least one game, said gaming device comprising:

a housing;

a template mounted in said housing;

a plurality of insert holders, each insert holder connected to and extending from said template and forming a sidewall that is bent from the template, forming an edge and is at least substantially continuous so as to define an aperture inside the sidewall, the template extending from, continuously along and between the edges of two of the sidewalls of at least two of the insert holders to form a gap between the two insert holders; and a plurality of inserts, each insert removably connected to one of said insert holders, said inserts each including indicia for indicating an element of the game.

2. The gaming device of claim 1, wherein each insert holder and each insert includes means for removably attaching said insert to said insert holder.

3. The gaming device of claim 1, wherein each insert holder and each insert includes co-acting means for removably attaching said insert to said insert holder.

4. The gaming device of claim 1, wherein at least one of the insert holders includes a lip connected to the template which defines an aperture adapted to receive one of the inserts.

5. The gaming device of claim 4, wherein said one of the insert holders includes a base connecting the template and the lip.

6. The gaming device of claim 5, wherein the base converges from the template to the lip.

7. The gaming device of claim 1, wherein at least one of the insert holders includes a tubular lip connected to the template which defines an aperture adapted to receive one of the inserts.

8. The gaming device of claim 1, wherein at least one of the insert holders defines at least one slot adapted to receive a tab attached to one of the inserts.

9. The gaming device of claim 1, wherein a plurality of said insert holders are substantially horizontally aligned on the template.

10. The gaming device of claim 1, wherein a plurality of said insert holders are substantially vertically aligned on the template.

11. The gaming device of claim 1, wherein at least two of the insert holders are of different shapes.

12. The gaming device of claim 1, wherein at least two of the insert holders are similarly shaped.

13. The gaming device of claim 1, wherein said insert holders have a shape selected from the group consisting of shapes with one or more straight sides, shapes with one or more curved sides and combinations thereof.

14. The gaming device of claim 1, wherein the indicia is selected from the group consisting of symbols, numbers, letters and combinations thereof.

15. The gaming device of claim 1, wherein the inserts are at least partially translucent.

16. The gaming device of claim 1, wherein at least two of the insert holders are connected to the template in spaced apart relation.

17. The gaming device of claim 1, wherein said template is a molded plastic.

18. The gaming device of claim 1, wherein the insert holders are integrally formed with the template.

19. The gaming device of claim 1, wherein the inserts are plastic.

20. A gaming device having at least one game, said gaming device comprising:

a housing;

a template connected to said housing and having a plurality of sections;

an insert holder-extending from each section and forming a sidewall that is bent from the template forming an edge, wherein the sidewall is at least substantially continuous so as to define an aperture inside the sidewall, the template extending from, continuously along and between the edges of two of the sidewalls of at least two of the insert holders to form a gap between the two insert holders; and an indicia bearing insert relating to play of the game removably covering the aperture of the insert holder of each section.

21. The gaming device of claim 20, wherein at least one of the sections includes a plurality of similarly shaped insert holders.

22. The gaming device of claim 20, wherein at least one of the sections includes a plurality of different shaped insert holders.

23. The gaming device of claim 20, wherein at least one of the sections includes a plurality of spaced-apart insert holders.

24. The gaming device of claim 20, wherein each section includes different shaped insert holders.

25. The gaming device of claim 20, wherein the indicia is selected from the group consisting of symbols, numbers, letters and combinations thereof.

26. The gaming device of claim 20, wherein each insert holder has a shape selected from the group consisting of shapes with one or more straight sides, shapes with one or more curved sides and combinations thereof.

27. A gaming device having at least one game, said gaming device comprising:

a housing;

a plurality of different shaped insert holders, each insert holder forming a sidewall that is at least substantially continuous so as to define an aperture inside the sidewall;

a template mounted in said housing and having a plurality of sections, each section having at least one of said insert holders extending therefrom, the sidewall being bent from the template, forming an edge, the template extending from, continuously along and between the edges of two of the sidewalls of at least two of the insert holders of at least one of the sections to form a gap between the insert holders; and a plurality of different shaped inserts, each insert including indicia relating to said game and adapted to removably engage the insert holder having a corresponding shape to said insert.

28. The gaming device of claim 27, wherein the inserts are generally planar.

29. The gaming device of claim 27, wherein each insert holder defines a plurality of slots for removably receiving one of the inserts.

30. The gaming device of claim 29, wherein said insert includes a plurality of tabs adapted to removably engage the slots in said insert holder.

31. The gaming device of claim 29, wherein the slots are formed in the base of the insert holder.

32. The gaming device of claim 27, wherein each insert holder includes a lip defining an aperture for receiving one of the inserts.

33. The gaming device of claim 27, wherein each insert holder includes a base extending from the template and a lip extending from the base.

34. The gaming device of claim 27, wherein at least one of the template, insert holders and inserts are at least partially translucent.

35. The gaming device of claim 27, which includes an illumination source mounted in the housing adjacent to the template and adapted to direct light through at least one of the inserts.

36. The gaming device of claim 35, wherein the illumination source is adapted to provide a plurality of different colored lights.

37. The gaming device of claim 27, wherein each section includes a different shaped insert holder.

38. The gaming device of claim 27, wherein each section includes a plurality of different shaped insert holders.

39. The gaming device of claim 27, wherein the indicia is selected from the group consisting of symbols, numbers, letters and combinations thereof.

40. The gaming device of claim 27, wherein said different shaped inserts are selected from the group consisting of shapes with one or more curved sides, shapes with one or more straight sides and combinations thereof.

41. The gaming device of claim 27, wherein the inserts are a flexible material.

42. A gaming device having a game, said gaming device comprising:

a housing;

a template mounted in said housing;

a plurality of different shaped insert holders, each insert holder extending transversely from said template and forming a sidewall that is bent directly from the template, forming an edge, wherein the sidewall is at least substantially continuous so as to define an aperture inside the sidewall, the template extending from, continuously along and between the edges of two of the sidewalls of at least two of the insert holders to form a gap between the insert holders; and a plurality of different shaped inserts removably connected to said insert holders, each said insert indicating a function of the game.

43. The gaming device of claim 42, wherein the inserts indicate one function of the game including a symbol.

44. A gaming device having at least one game, said gaming device comprising:

a housing;

a frame mounted in said housing, said frame including at least two portions;

a plurality of insert holders, each insert holder extending from a different one of the portions of the frame, each said insert holder forming a sidewall that is bent from the frame, forming an edge, wherein the sidewall is at least substantially continuous so as to define an aperture inside the sidewall, the frame extending from, continuously along and between the edges of two of the sidewalls of two of the insert holders to form a gap between the insert holders; and a plurality of inserts, each insert removably covering the aperture of one of said insert holders, said inserts each including indicia for indicating an award in the game.

* * * * *

UNITED STATES PATENT AND TRADEMARK OFFICE

CERTIFICATE OF CORRECTION

PATENT NO. : 6,695,703 B1
DATED : February 24, 2004
INVENTOR(S) : McGahn

It is certified that error appears in the above-identified patent and that said Letters Patent is hereby corrected as shown below:

Column 2,
Line 16, change "FIG. 1" to -- FIG. 2 --.
Line 60, change "card dispenses" to -- card dispensers --.
Line 65, change "source" to -- source (not shown) --.

Column 4,
Line 43, change "space" to -- spaced --.
Line 61, change "with an" to -- with --

Column 8,
Line 8, change "holder-extending" to -- holder extending --.

Signed and Sealed this

Twenty-second Day of June, 2004

JON W. DUDAS
*Acting Director of the United States Patent and Trademark Office*